United States Patent
Blanchard et al.

(10) Patent No.: US 7,043,022 B1
(45) Date of Patent: May 9, 2006

(54) PACKET ORDER DETERMINING METHOD AND APPARATUS

(75) Inventors: Scott D. Blanchard, Mesa, AZ (US); Dean P. Vanden Heuvel, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/447,312

(22) Filed: Nov. 22, 1999

(51) Int. Cl.
*H04L 9/00* (2006.01)
*H04J 1/16* (2006.01)

(52) U.S. Cl. ............... 380/252; 380/206; 380/209; 380/252; 380/260; 380/274; 370/389; 370/394

(58) Field of Classification Search ............... 380/274, 380/260, 206, 209, 252; 370/394, 389
See application file for complete search history.

(56) References Cited

U.S. PATENT DOCUMENTS

| 3,979,719 | A | * | 9/1976 | Tooley et al. | 714/748 |
| 4,745,599 | A | * | 5/1988 | Raychaudhuri | 370/348 |
| 4,754,482 | A |   | 6/1988 | Weiss | 380/48 |
| 4,977,596 | A | * | 12/1990 | Maestas et al. | 380/260 |
| 5,151,899 | A | * | 9/1992 | Thomas et al. | 370/394 |
| 5,337,313 | A | * | 8/1994 | Buchholz et al. | 370/394 |
| 5,341,423 | A | * | 8/1994 | Nossen | 380/252 |
| 5,353,352 | A | * | 10/1994 | Dent et al. | 380/37 |
| 5,528,693 | A |   | 6/1996 | Leopold | 380/48 |
| 5,608,662 | A | * | 3/1997 | Large et al. | 708/300 |
| 5,761,424 | A | * | 6/1998 | Adams et al. | 709/217 |
| 5,761,431 | A | * | 6/1998 | Gross et al. | 709/225 |
| 5,771,288 | A | * | 6/1998 | Dent et al. | 380/270 |
| 5,862,160 | A | * | 1/1999 | Irvin et al. | 714/807 |

(Continued)

FOREIGN PATENT DOCUMENTS

| EP | 0762705 A | 3/1997 |
| WO | WO 99 49695 A | 9/1999 |

OTHER PUBLICATIONS

Sholander P. et al: "*The Effect of Algorithm—Agile Encryption On ATM Quality of Services*", Nov. 1997, Global Telecommunications Conference (GLOBECOM), US, New York, IEEE, pp. 470-474 XP000737578, ISBN: 0-78903-4099-6.

(Continued)

*Primary Examiner*—Ayaz Sheikh
*Assistant Examiner*—Taghi T. Arani

(57) ABSTRACT

A transmitter adds packet transmission order information to transmitted packets using a forward error device (416) and a masking device (420). The masking device (420) receives ordering masks (610) from a mask store (424). The ordering masks (610) are maintained in a known order, and the ordering masks (610) and the known order are known to both the transmitter and the receiver. The receiver includes an unmasking device (504) that applies ordering masks to unmask the packets, and then an error detection device checks for errors. The ordering masks (610) are applied in the known order until errors are below an acceptable limit. When errors are below an acceptable limit, the relative packet order is determined from the known order of the ordering masks.

26 Claims, 8 Drawing Sheets

U.S. PATENT DOCUMENTS

| | | | | |
|---|---|---|---|---|
| 5,883,891 A | * | 3/1999 | Williams et al. | 370/356 |
| 5,966,450 A | * | 10/1999 | Hosford et al. | 380/261 |
| 6,141,788 A | * | 10/2000 | Rosenberg et al. | 714/774 |
| 6,473,424 B1 | * | 10/2002 | DeJager et al. | 370/389 |

OTHER PUBLICATIONS

Pierson L.G. et al: "*Context-Agile Encryption For High Speed Communication Networks*", Jan. 1999, Computer Communications Review, US, Association For Computing Machinery, New York, vol. 29, NR. 1, pp. 35-49 XP000823872, ISSN: 0146-4833.

S. Kent: "RFC 2406", Internet, (Online)—Nov. 1998 XP002170517, Retrieved from the Internet: URL: http://www.ietf.org/html.charters/ipsec-charter.html. (retrieved on Jun. 25, 2001).

* cited by examiner

PACKET ORDER DETERMINING METHOD AND APPARATUS

FIELD OF THE INVENTION

The present invention relates generally to packet switched networks and, in particular, to variable delay packet switched networks.

BACKGROUND OF THE INVENTION

Some communications systems utilize packet switched networks that allow packets of information to arrive at a receiver in a different order than they were transmitted. Some applications are sensitive to the received order of packets, and it can be desirable to be able to identify when packets are received out of order so that corrective steps can be taken.

Secure networks are one example of an application sensitive to the received order of packets. In some secure networks, encryption keys used at the transmitter and receiver are synchronized. When encrypted packets are received out of order at the receiver, synchronization can be lost. Another example of an application sensitive to the received order of packets is voice data as voice data processed out of order at a receiver can result in degraded voice quality output.

In order to ensure proper ordering of packets, portions of packets can be dedicated to hold packet-ordering information. For example, a field in a packet header can be used to hold information specifying the relative order of a packet. When the packet contents are read, packets received out of order can be re-arranged into the correct order. However, utilizing portions of a packet to specify relative packet order consumes communications channel bandwidth. It would be desirable for a communications system to be able to specify the order of transmitted packets without consuming communications channel bandwidth.

Accordingly, a significant need exists for a method and apparatus for communicating packet ordering in communications systems without consuming communications channel bandwidth.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and wherein:

DETAILED DESCRIPTION OF THE DRAWINGS

In the following detailed description, reference is made to the accompanying drawings that show, by way of illustration, specific embodiments in which the invention may be practiced. It is to be understood that other embodiments may be utilized and structural changes may be made without departing from the scope of the present invention.

The method and apparatus of the present invention provide a mechanism for determining the relative transmission order of packets in a packet switched network. Transmitted packets have error detection or forward error correction applied, and then they are masked with "ordering masks" prior to transmission. The ordering masks are applied to packets in an order that is known to both the transmitter and receiver. The receiver unmasks received packets and performs error detection. The proper relative transmission order of the packet is found when the correct ordering mask is used, resulting an acceptable error rate.

Figure 1:
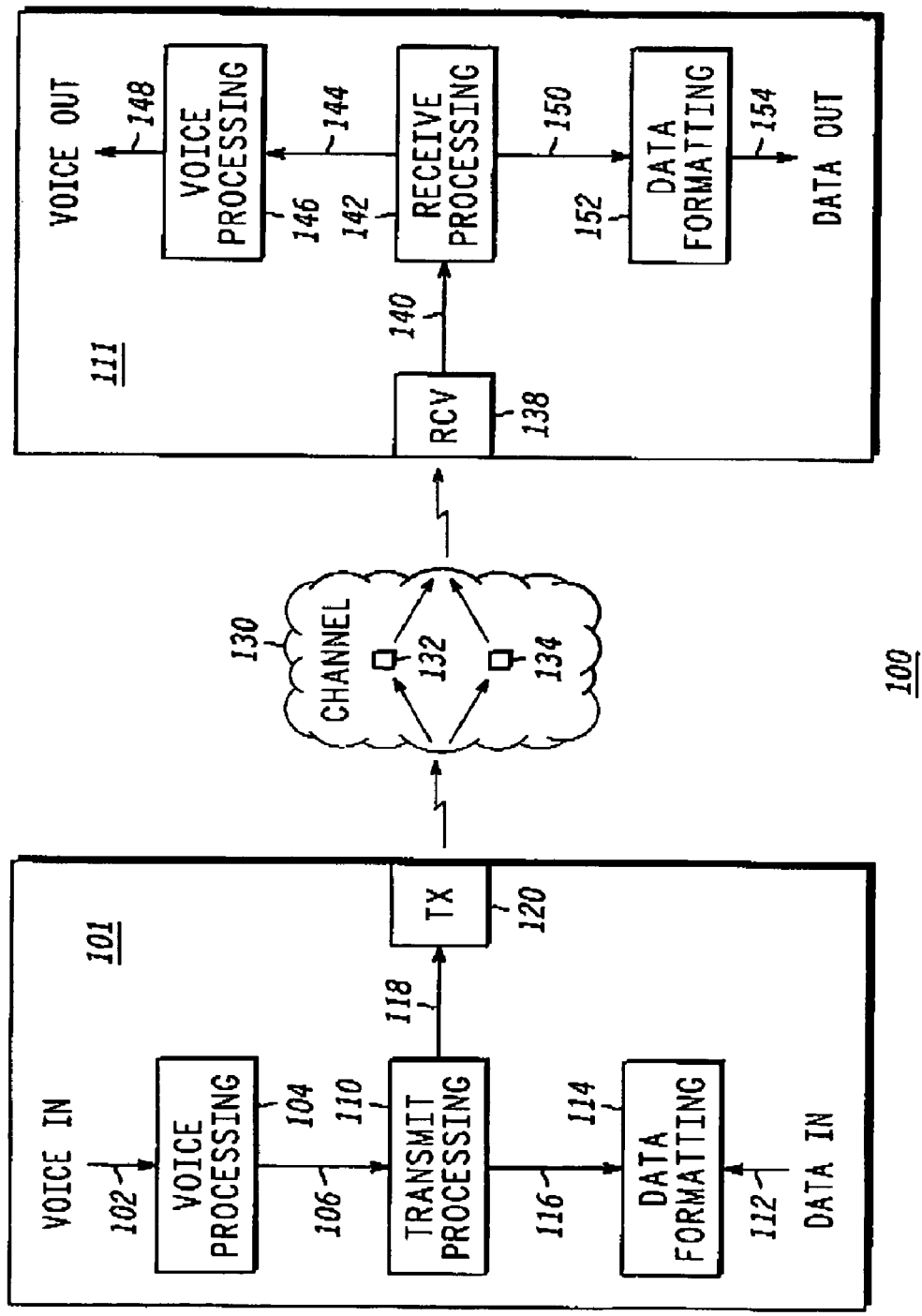
FIG. 1 shows a packet switched communications system in accordance with a preferred embodiment of the present invention.

Turning now to the drawings in which like reference characters indicate corresponding elements throughout the several views, attention is first directed to FIG. 1. FIG. 1 shows a packet switched communications system in accordance with a preferred embodiment of the present invention. Communications system 100 includes communications devices 101 and 111 that communicate over channel 130. Communications system 100 can include any number of communications devices.

Communications device 101 includes voice processing block 104, transmit processing block 110, data formatting block 114, and packet transmitter 120. Voice processing block 104 receives voice signals on node 102, processes them, produces packets representing the voice signals, and send the packets to transmit processing block 110. Voice processing block 104 can include a microphone, an audio circuit for conditioning and sampling, and a vocoder. Data formatting block 114 receives data on node 112 and formats it prior to transmission. Formatting can include inserting data in packets and adding packet header information.

Voice processing block 104 and data formatting block 114 are examples of packet formatting blocks. The packet formatting blocks output packets that are input to transmit processing block 110. Other types of packet formatting blocks can be used without departing from the scope of the present invention. For example, transmit processing block 110 can receive formatted packets from a separate data processing system or a separate communications system. In these embodiments, the separate data processing system and separate communications system are examples of packet formatting blocks.

Transmit processing block 110 receives voice packets on node 106 and data packets on node 116. Transmit processing block 110 applies ordering masks to the packets such that the transmitted order of the packets can be discerned at the receiver, even when the packets are received out of order at the receiver. Embodiments of transmit processing block 110 are discussed below with reference to FIGS. 4 and 7.

Transmit processing block 110 sends packets to packet transmitter 120 on node 118. Packet transmitter 120 performs additional processing prior to transmission, such as interleaving and modulation. Packet transmitter 120 transmits blocks of data into channel 130.

Channel 130 can be any communications channel that allows packets to arrive at a receiver in a different order than they were transmitted. For example, channel 130 can be a satellite communications system that provides multiple communications paths, or it can be a network in which packets can take different routes to a destination, such as the Internet. Multiple communications paths are shown in channel 130 as paths 132 and 134. If both paths 132 and 134 are utilized by communications system 100, and paths 132 and 134 exhibit different end-to-end delay, packets can arrive at packet receiver 138 in a different order than they were transmitted by packet transmitter 120.

Communications device 111 includes packet receiver 138, receive processing block 142, voice processing block 146, and data formatting block 152. The blocks in communications device 111 generally perform the reverse of the corresponding blocks in communications device 101. For example, packet receiver 138 demodulates, de-interleaves, and sends packets to receive processing block 142 on node 140. Voice packets are sent from receive processing block 142 to voice processing block 146 on node 144, and data packets are sent from receive processing block 142 to data formatting block 152 on node 150. Voice processing block 146 performs the inverse operation of voice processing block 104 and outputs voice signals on node 148, and data formatting block 152 performs the inverse operation of data formatting block 114 and outputs data signals on node 154.

Figure 2:
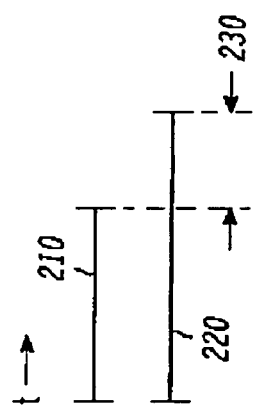
FIG. 2 shows variable latencies in a packet switched communications system in accordance with a preferred embodiment of the present invention.

FIG. 2 shows variable latencies in a packet switched communications system in accordance with a preferred embodiment of the present invention. Latencies 210 and 220 represent the minimum and maximum latencies in a network. For example, latency 210 can represent the end-to-end delay of path 132 in channel 130 (FIG. 1) when path 132 is the shortest available path, and latency 220 can represent the end-to-end delay of path 134 when path 134 is the longest available path.

The difference between the shortest and longest delay yields the "maximum latency variability 230." The maximum latency variability 230 measures the largest difference in transmission time between two packets that can be expected to arrive out of order. For example, if the minimum latency of a network is 100 milliseconds, and the maximum latency of the network is 400 milliseconds, then the maximum latency variability of the network is 300 milliseconds. Packets transmitted less than the maximum latency variability apart in time, or less than 300 milliseconds apart, may arrive at a receiver out of order. In contrast, packets transmitted greater than 300 milliseconds apart cannot arrive out of order because they are transmitted greater than the maximum latency variability 230 apart in time. Minimum latency 210 is shown as a finite latency that is a substantial portion of maximum latency 220. In some embodiments, minimum latency 210 is very small, and it approaches zero, as is the case when a transmitter and receiver have a very direct path.

Figure 3:
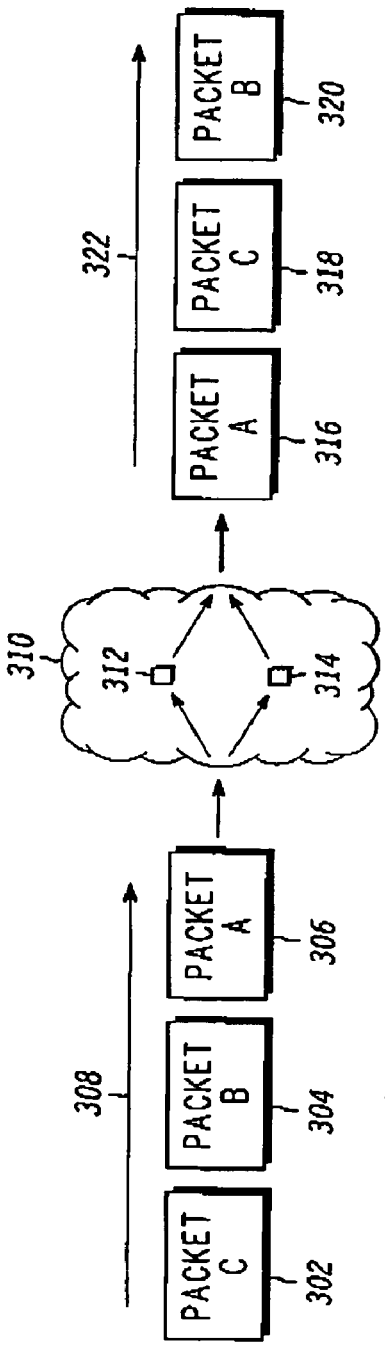
FIG. 3 shows relative ordering of packets in a packet switched communications system in accordance with an embodiment of the present invention.

FIG. 3 shows relative ordering of packets in a packet switched communications system in accordance with an embodiment of the present invention. Transmitted packets 302, 304, and 306 are transmitted into channel 310. They are received from channel 310 as packets 316, 318, and 320. The order of transmission is shown by direction 308. First packet A is transmitted, followed by packet B, and then followed by packet C. The order of reception is shown by direction 322. First packet B is received, followed by packet C, and then followed by packet A. Packet A has been received out of order by two packets.

Channel 310 is shown with two paths: path 312 and path 314. The out-of-order reception of packets can be caused by packets taking different paths. For example, if the latency of path 312 is greater than the latency of path 314 by two packet transmission times, and packet A is transmitted on path 312, the out-of-order reception shown in FIG. 3 results.

In some embodiments of the present invention, packets received out of order are discarded when they are older than previously received packets. For example, packet A would be discarded because it was received out of order and it is older than packets A and B, which have already been received. Packets B and C, although received out of order, would not be discarded, because they are not older than previously received packets. These embodiments can be advantageous in applications such as voice processing. When coded speech is being transmitted, sending packets to the vocoder out of order can cause undesirable results. When a packet is discarded, modern vocoders estimate the missing speech and produce good quality results.

In other embodiments of the present invention, packets received out of order are buffered, and the correct order is reconstructed as other out-of-order packets arrive. In these embodiments, in the example of FIG. 3, packets B and C are buffered, and packet A is restored to its proper location prior to sending the packets on. These embodiments can be advantageous in applications such as encrypted communications and data communications. In encrypted communications, packet order can be important in part for maintaining sequences of cryptographic keys between transmitters and receivers. In data communications, packet order can be important, in part because out-of-order packets can cause corrupt files.

Figure 4:
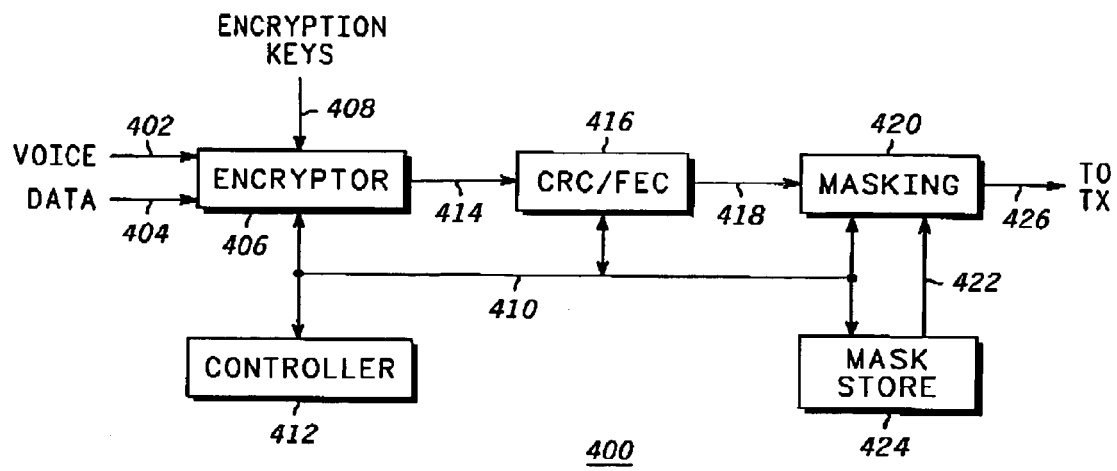
FIG. 4 shows a transmit processing block in accordance with a preferred embodiment of the present invention.

FIG. 4 shows a transmit processing block in accordance with a preferred embodiment of the present invention. Transmit processing block 400 is an embodiment of transmit processing block 110 (FIG. 1). Transmit processing block 400 includes encryptor 406, forward error device 416, masking device 420, mask store 424, and controller 412.

Voice packets are received on node 402 which corresponds to node 106 in FIG. 1, and data packets are received on node 404 which corresponds to node 116 in FIG. 1. For ease of description, nodes 402 and 404 are both shown entering encryptor 406. One skilled in the art will understand that a multiplexor or other suitable circuit can be utilized to multiplex the voice and data packets into encryptor 406.

Encryptor 406 encrypts packets and sends encrypted packets to forward error device 416 via node 414. Encryptor 406 receives encryption keys on node 408. Node 408 can be coupled to a key generator that is internal or external to communications device 101 (FIG. 1). In a preferred embodiment, encryptor 406 is an exclusive-or (XOR) operator that XOR's the packets with the encryption keys. In other embodiments, encryptor 406 utilizes other operators, such as public key cryptography.

Forward error device 416 performs operations such as applying error detection codes, applying error correction codes, and performing compression. Typical error detection codes such as cyclical redundancy check (CRC), and forward error codes (FEC) are well known in the art, and they need not be explained further here.

In some embodiments, forward error device 416 applies error codes differently as a function of the data source. For example, when voice packets are received on node 402, the operation of forward error device 416 can be different than when data packets are received on node 404, in part because it can be desirable to apply more coding to some portions of speech than to others.

Packets having error codes applied are sent to masking device 420 on node 418. Masking device 420 applies ordering masks to the packets to produce masked packets on node 426. Ordering masks are received from mask store 424 on node 422. In a preferred embodiment, ordering masks are digital words having the same size as the packets received on node 418. However, it should be understood that ordering masks could be larger or smaller than the packets received on node 418. Ordering masks are applied to packets using an operation that can be performed in reverse at a receiver. In a preferred embodiment, ordering masks are applied to packets using an XOR operation.

Mask store 424 includes a list of ordering masks in a known order. Each ordering mask is unique, and each ordering mask is applied to one packet at a time, and in order. In some embodiments, mask store 424 is a circular buffer and each ordering mask is used repeatedly or at least more than once. In a preferred embodiment, mask store 424 includes a number of masks sufficient to allow a unique ordering mask to be applied to each packet transmitted within a time period equal to the maximum latency variability. Mask store 424 is discussed further with reference to FIG. 6 below.

Controller 412 is coupled to encryptor 406, forward error device 416, masking device 420, and mask store 424, by bus 410. In some embodiments, controller 412 is a processor such as a microprocessor, digital signal processor, or the like. In other embodiments, controller 412 is dedicated hardware, such as a state machine. Controller 412 operates to maintain proper timing between the various devices.

In some embodiments, encryptor 406 is omitted, and packets are received by forward error device 416 from a packet formatter such as voice processing block 104 or data formatting block 114. Packets undergo the application of error detection codes or forward error correction codes, and then undergo masking prior to transmission.

Figure 5:
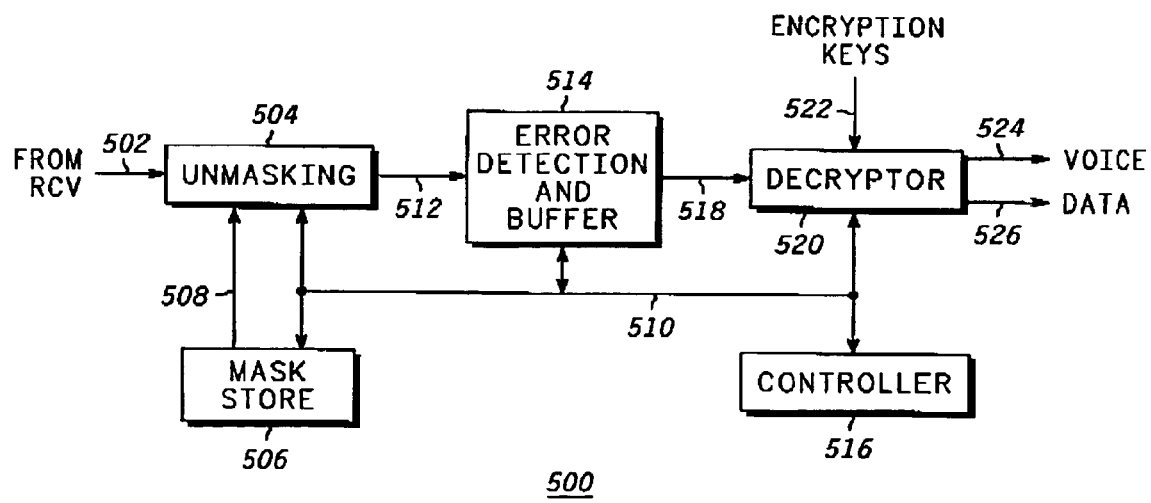
FIG. 5 shows a receive processing block in accordance with a preferred embodiment of the present invention.

FIG. 5 shows a receive processing block in accordance with a preferred embodiment of the present invention. Receive processing block 500 is an embodiment of receive processing block 142 (FIG. 1). Receive processing block 500 includes unmasking device 504, mask store 506, error detection device and buffer 514, decryptor 520, and controller 516.

Receive processing block 500 receives packets on node 502 from packet receiver 138 (FIG. 1). Packets on node 502 have been encrypted, have had error coding applied, and have been masked by transmit processing block 400. As discussed above, packets arriving on node 502 may be out-of-order packets, such as those shown in FIG. 3. Receive processing block 500 determines whether the packets on node 502 are out-of-order. In some embodiments, out-of-order packets are discarded, and in other embodiments, out-of-order packets are buffered and the correct order is restored.

Unmasking device 504 receives masked packets on node 502, and it applies ordering masks from mask store 506 to the masked packets. In a preferred embodiment, unmasking device 504 is an XOR operator that receives ordering masks on node 508 and XOR's the ordering masks with received packets on node 502. When a received packet is in the correct order, the ordering mask received from mask store 506 on node 508 will correctly unmask the received packet. Unmasking device 504 sends the unmasked packet on node 512 to error detection device and buffer 514. Error detection device and buffer 514 performs the reverse of forward error device 416. When the correct ordering mask has been used, as is the case in this example, no errors are found.

When a received packet is out-of-order, the first ordering mask received from mask store 506 will not correctly unmask the received packet. As a result, error detection device and buffer 514 will detect errors. When errors are detected by error detection device and buffer 514, different ordering masks from mask store 506 are sent to unmasking device 504. Different ordering masks are used to unmask the received packets until error detection device and buffer 514 reports an acceptable amount of errors. Because the order of ordering masks in mask store 506 is known to correspond to the transmitted order of packets, the correct transmitted order of received packets can be discerned at the receiver, even when received out of order.

In one embodiment, error detection device and buffer 514 buffers packets that are received out of order. When enough packets have been received to re-create the correct transmitted order, error detection device and buffer 514 outputs packets in the correct order on node 518. The re-creation of the correct transmitted order is advantageous in part because decryptor 520 receives encryption keys, via node 522, that are synchronized with encryption keys used at the transmitter. When packets are received in order at decryptor 520, synchronization is maintained. In contrast, when packets are not received in order at decryptor 520, synchronization can be lost. In either case, decrypted voice data are output via node 524, and decrypted non-voice data are output via node 526.

In another embodiment, error detection device and buffer 514 discards out-of-order packets that are older than packets previously received. In this embodiment, error detection device and buffer 514 may not include a buffer. Instead, error detection device and buffer 514 sends packets that are not discarded on node 518 to decryptor 520, and decryptor 520 receives packet order information either from error detection device and buffer 514 on node 518, or from controller 516 on bus 510. In this manner, decryptor 520 can maintain synchronization even though packets have been discarded. This embodiment can be advantageous when receive processing block 500 is used in secure voice applications. Some packets can be discarded without materially degrading a voice signal. By allowing packets to be discarded, processing complexity can be reduced, and data throughput can be increased.

Controller 516 communicates with other devices in receive processing block 500 using bus 510. In a preferred embodiment, controller 516 keeps track of the correct order of ordering masks in mask store 506. Controller 516 also receives error information from error detection device and buffer 514. In this manner, controller 516 can step through mask store 506 and cause unmasking device 504 to apply ordering masks until an acceptable amount of errors are reported by error detection device and buffer 514. In some embodiments, controller 516 is a processor such as a microprocessor, a digital signal processor, or the like. In other embodiments, controller 516 is made up of dedicated hardware, such as a state machine. In some of these embodiments, controller 516 is distributed among the other devices such that each device provides control circuitry sufficient to practice the present invention.

Figure 6:
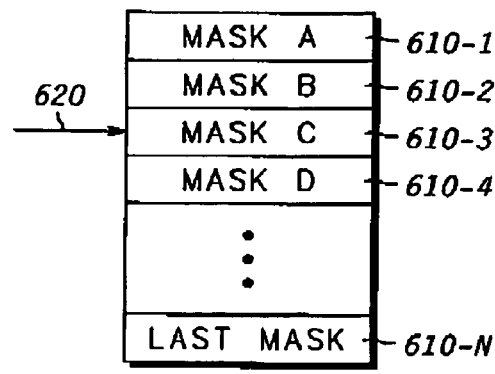
FIG. 6 shows a mask store in accordance with a preferred embodiment of the present invention.

FIG. 6 shows a mask store in accordance with a preferred embodiment of the present invention. Mask store 600 includes a list of ordering masks 610-1, 610-2, 610-3, 610-4, ... 610-N. Also shown in FIG. 6 is ordering mask pointer 620. Ordering mask pointer 620 can point to a current ordering mask. When mask store 600 is utilized in a transmit processing block, such as mask store 424, the current ordering mask is the ordering mask corresponding to the most recently transmitted packet. When mask store 600 is utilized in a receive processing block, such as mask store 506, the current ordering mask is the ordering mask corresponding to the most recently received packet. As packets are transmitted and received, current ordering mask pointer 620 is advanced in the list of ordering masks within mask store 600. For example, mask A can be applied to a first packet, mask B can be applied to a second packet, and mask C can be applied to a third packet. After mask C has been applied, current ordering mask pointer 620 points to mask C as shown in FIG. 6.

When packets are received out of order as shown in FIG. 3, current ordering mask pointer 620 can point to mask C prior to receiving packet A which corresponds to mask A. When the next packet is received, the receive processing block will first use mask D. The error detection device will report errors because the correct ordering mask is mask A. Ordering masks from mask store 600 will be used in order through the last mask. In an embodiment that discards out-of-order packets that are older than previously received packets, the received packet will be thrown away. In an embodiment that re-creates the transmitted order of out-of-order packets, the remaining masks will be applied. Ordering mask A will be found to be the correct ordering mask for the received packet, and the packet will be placed in the correct order in the received data packet stream. Mask store 600 preferably maintains enough masks to discern the correct transmitted order of any packets transmitted within the maximum latency variability of each other.

Figure 7:
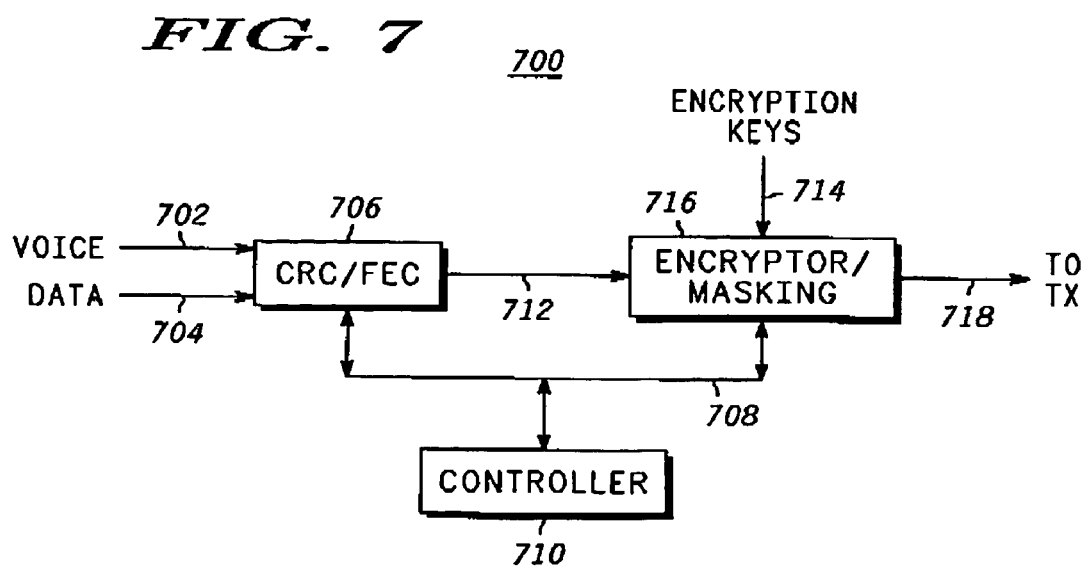
FIG. 7 shows a transmit processing block in accordance with an alternate embodiment of the present invention.

FIG. 7 shows a transmit processing block in accordance with an alternate embodiment of the present invention. Transmit processing block 700 includes forward error device 706, encryptor/masking device 716, and controller 710. Transmit processing block 700 does not encrypt packets prior to forward error device 706. Forward error device 706 receives voice packets on node 702 and data packets on node 704, and it applies forward error codes thereto. Packets having error codes applied are sent to encryptor/masking device 716 on node 712. In one embodiment, encryptor/masking device 716 encrypts packets and masks them in a single operation to supply encrypted/masked packets on node 718. Encryption keys are received on node 714, and they are used to encrypt packets received on node 712. The encryption keys received on node 714 are also used to mask the packets. Because the order of encryption keys is known at both the transmitter and the receiver, encryption keys can be used as ordering masks.

Controller 710 is coupled to forward error device 706 and encryptor/masking device 716 by bus 708. Controller 710 can be a processor such as a microprocessor, digital signal processor, or the like. Controller 710 can also be dedicated hardware, such as a state machine. In addition, controller 710 can be distributed hardware such that forward error device 706 and encryptor/masking device 716 provide their own control circuitry.

Figure 8:
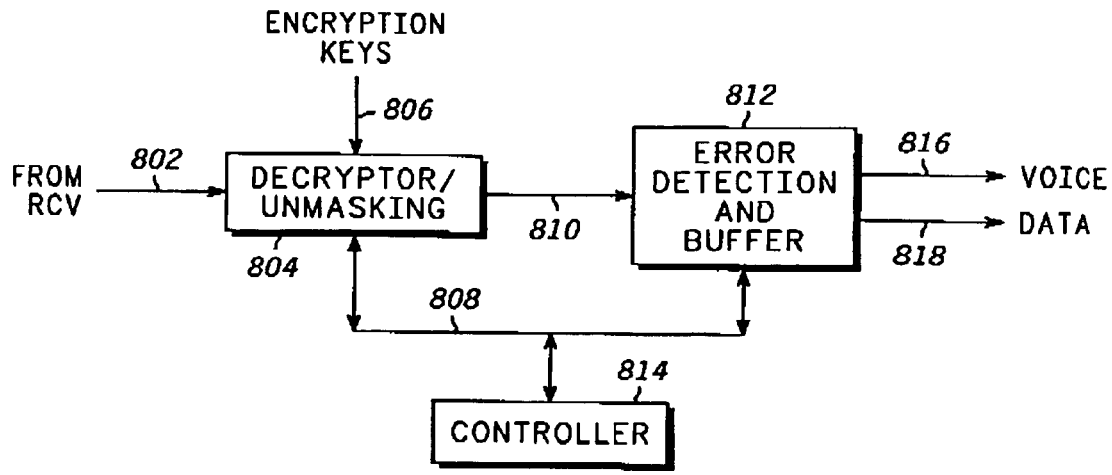
FIG. 8 shows a receive processing block in accordance with an alternate embodiment of the present invention.

FIG. 8 shows a receive processing block in accordance with an alternate embodiment of the present invention. Receive processing block 800 includes decryptor/unmasking device 804, error detection device and buffer 812, and controller 814. The operation of receive processing block 800 is analogous to the operation of receive processing block 500 (FIG. 5). Packets received on node 802 are unmasked by decryptor/unmasking device 804. Unmasked packets are sent to error detection device and buffer 812 on node 810. Error detection device and buffer 812 performs error detection and reports errors to controller 814 on bus 808. When errors are found, an incorrect mask was used in the unmasking operation by decryptor/unmasking device 804.

Decryptor/unmasking device 804 utilizes encryption keys received on node 806 as ordering masks to unmask packets received on node 802. When the correct encryption key is used to unmask a received packet, the packet is unmasked and decrypted in a single operation.

Error detection device and buffer 812 operates in a fashion analogous to error detection device and buffer 514 (FIG. 5). In some embodiments, error detection device and buffer 812 buffers packets received out of order and re-creates the correct order. In other embodiments, error detection device and buffer 812 discards packets that are older than previously received packets. Error detection device and buffer 812 outputs voice data on node 816 and non-voice data on node 818.

Controller 814 communicates with decryptor/unmasking device 804 and error detection device and buffer 812 utilizing bus 808. Controller 814 can be a processor such as a microprocessor, digital signal processor, or the like. Controller 814 can also be dedicated hardware such as a state machine, either centralized or distributed among the various devices.

Figure 9:
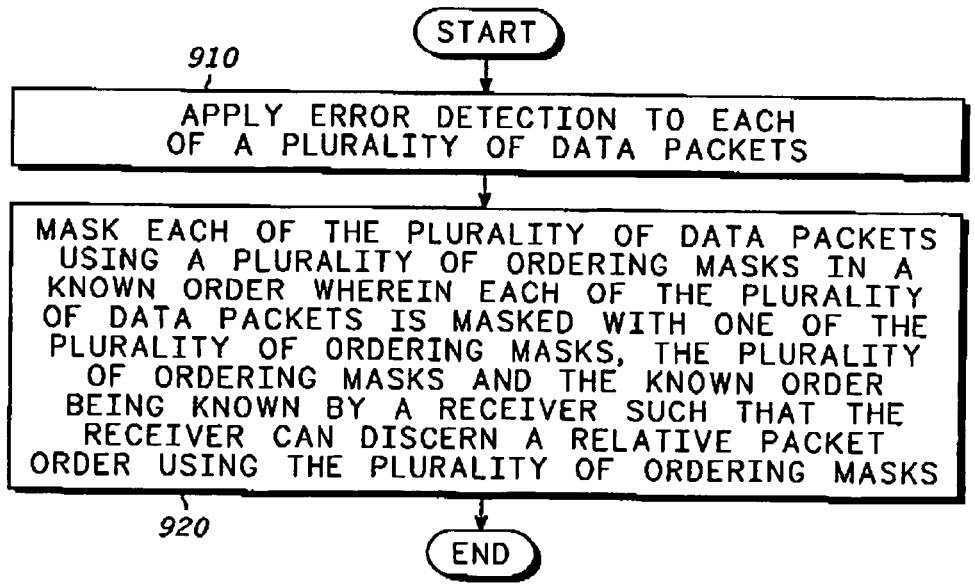
FIG. 9 is a flowchart of a method for adding packet ordering information to a plurality of data packets in accordance with a preferred embodiment of the present invention.

FIG. 9 is a flowchart of a method for adding packet ordering information to a plurality of data packets in accordance with a preferred embodiment of the present invention. Method 900 begins in block 910 when error detection is applied to each of a plurality of data packets. Block 910 corresponds to the operation of forward error device 416 (FIG. 4), or forward error device 706 (FIG. 7). In block 920, each of the plurality of data packets is masked using ordering masks. The ordering masks are maintained in a known order, such as those shown in FIG. 6. The ordering masks and the known order are also known by a receiver such that the receiver can discern the relative packet order of each of the plurality of data packets.

Figure 10:
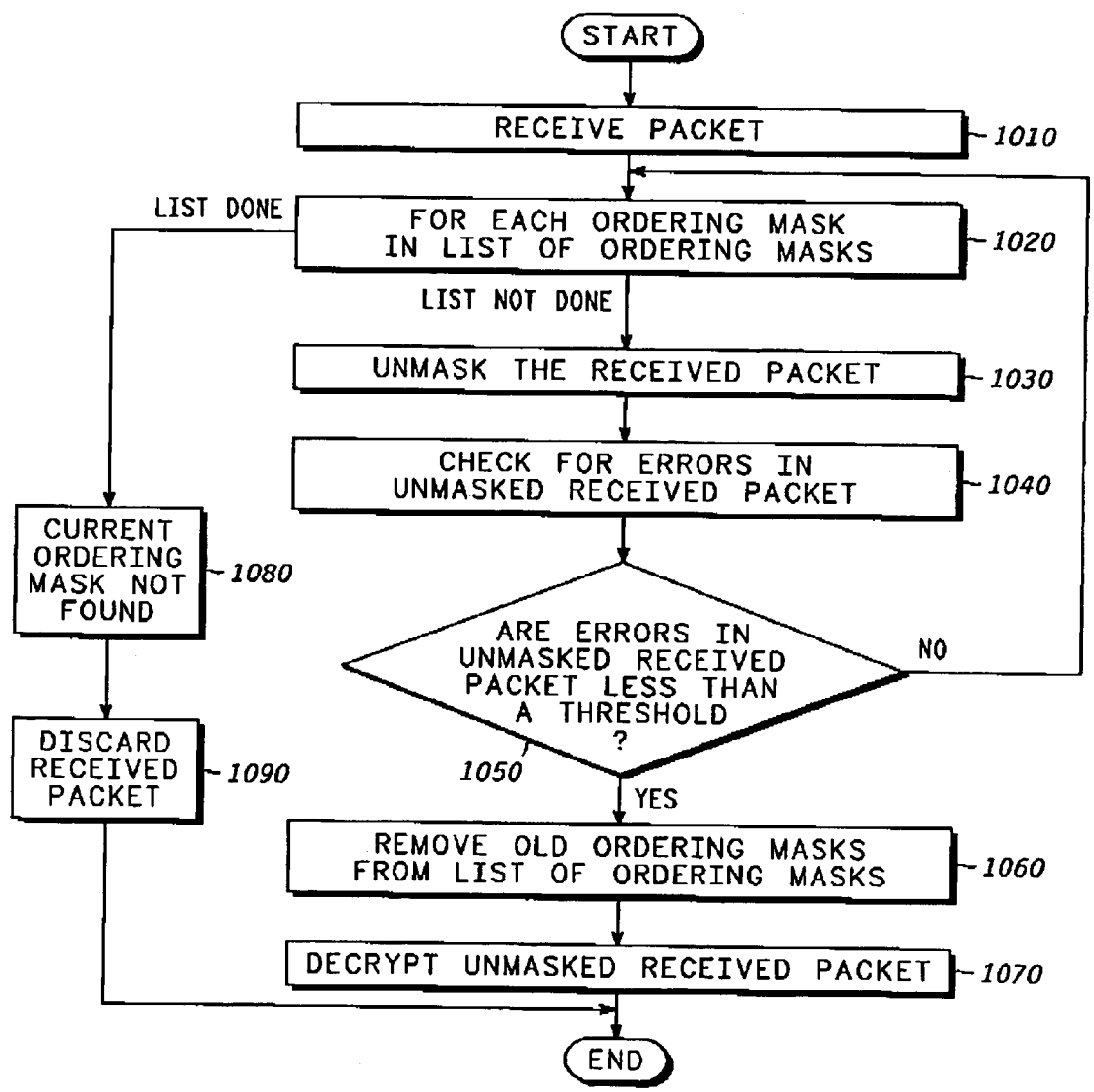
FIG. 10 is a flowchart of a method for determining the transmitted order of a received packet relative to other received packets in accordance with a preferred embodiment of the present invention.

FIG. 10 is a flowchart of a method for determining the transmitted order of a received packet relative to other received packets in accordance with a preferred embodiment of the present invention. Method 1000 begins in block 1010 when a packet is received. As described in block 1020, blocks 1030, 1040, and 1050 are successively traversed for each ordering mask in a list of ordering masks. In block 1030, an ordering mask is used to unmask the received packet. In block 1040, the unmasked received packet is checked for errors. In block 1050, the errors in the unmasked received packet are compared to a threshold. If the errors are below a threshold, processing proceeds with block 1060. If errors are above a threshold, another ordering mask is utilized beginning with block 1020.

If, in block 1020, all ordering masks have been successively tried without finding the correct ordering mask, as shown in block 1080, the received packet is discarded in block 1090.

When the correct ordering mask is found, ordering masks older than the correct ordering mask are removed from the list of ordering masks in block 1060. In block 1070, the unmasked received packet is decrypted.

Method 1000 corresponds to the operation of a receive processing block that discards received packets that are older than previously received packets. For example, when method 1000 is applied using receive processing block 500 (FIG. 5), ordering masks are removed from mask store 506 when they correspond to packets that are older than previously received packets. When the remaining ordering masks in mask store 506 are applied, and the correct ordering mask is not found, the received packet is discarded.

Figure 11:
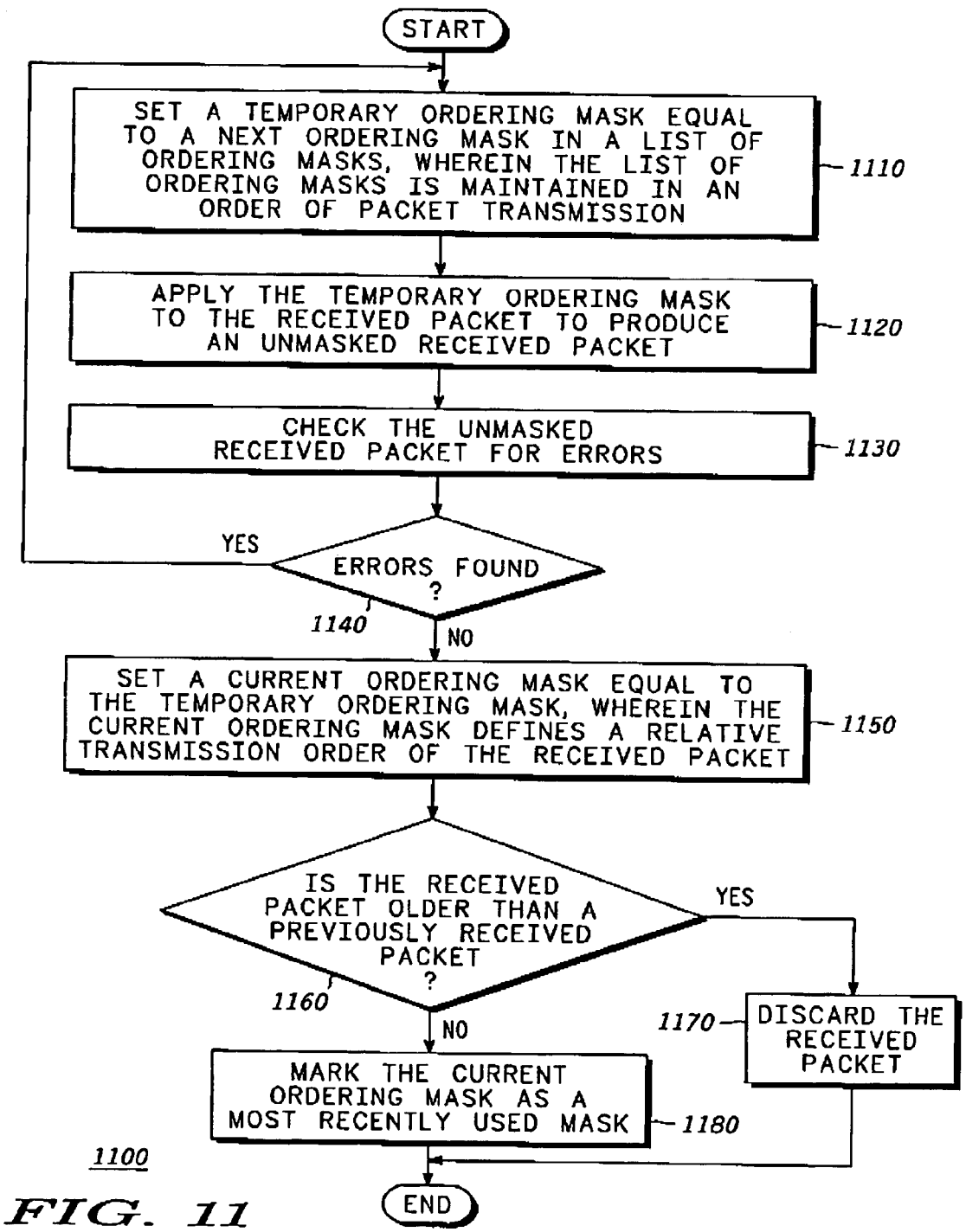
FIG. 11 is a flowchart of a method for determining the transmitted order of a received packet relative to other received packets in accordance with an alternate embodiment of the present invention.

FIG. 11 is a flowchart of a method for determining the transmitted order of a received packet relative to other received packets in accordance with an alternate embodiment of the present invention. Method 1100 begins in block 1110 when a temporary ordering mask is set equal to a next ordering mask in a list of ordering masks. The ordering masks are maintained in order of packet transmission, such as the list of ordering masks shown in FIG. 6. The temporary ordering mask can be located in a register maintained within unmasking device 504 or mask store 506 (FIG. 5), for the purpose of performing an unmasking operation. The temporary ordering mask can be modified without physically modifying the ordering masks within the mask store.

In block 1120, the temporary ordering mask is applied to a received packet to produce an unmasked received packet. The unmasked received packet corresponds to a packet on node 512. In block 1130, the unmasked received packet is checked for errors. If errors are found in block 1140, a next ordering mask is tried again in block 1110. When errors are not found, a current ordering mask is set equal to the temporary ordering mask in block 1150. The current ordering mask defines the relative transmission order of the received packets.

In block 1160, the received packet is checked whether it is older than previously received packet. If so, the received packet is discarded in block 1170. If not, the current ordering mask is marked as the most recently used mask in block 1180. The most recently used mask corresponds to the mask pointed to by ordering mask pointer 620 (FIG. 6).

The embodiment of FIG. 11 discards the received packet when it is older than a previously received packet. In another embodiment, block 1170 buffers received packets rather than discarding received packets, such that the correct order of received packets can be re-created. This can be accomplished using buffers such as error detection device and buffer 514 (FIG. 5), and error detection device and buffer 812 (FIG. 8).

Figure 12:
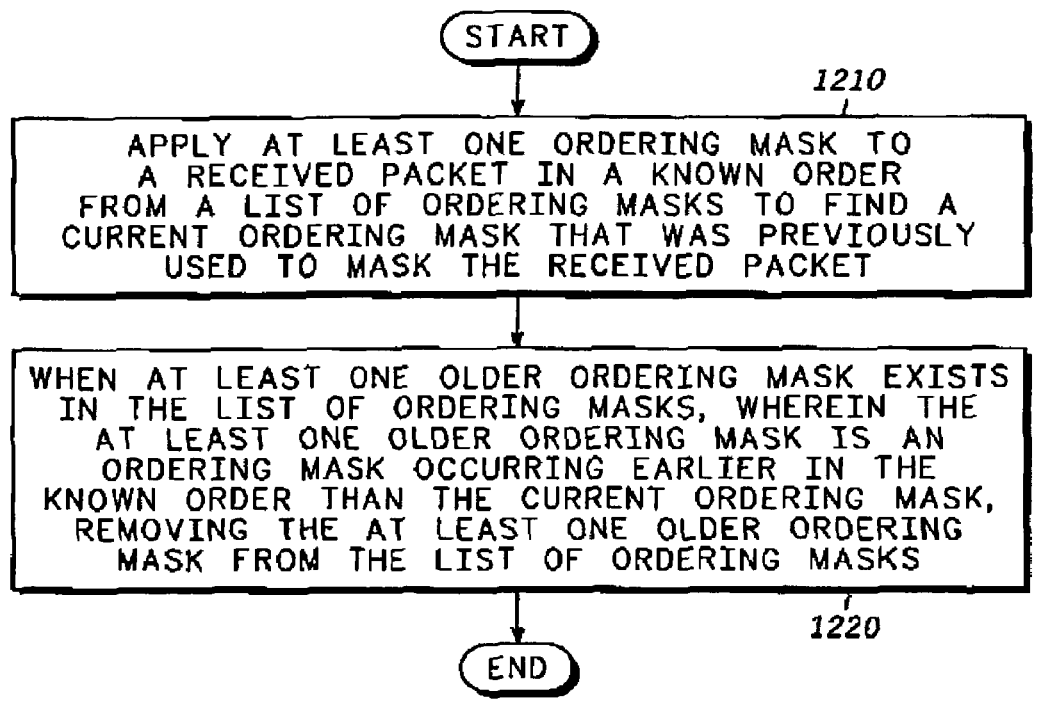
FIG. 12 is a flowchart of a method for determining a packet order of a received packet in accordance with a preferred embodiment of the present invention.

FIG. 12 is a flowchart of a method for determining a packet order of a received packet in accordance with a preferred embodiment of the present invention. Method 1200 begins in block 1210 when at least one ordering mask is applied to a received packet. The at least one ordering mask is applied in a known order from a list of ordering masks to find a current ordering mask that was previously used to mask a received packet. In block 1220, ordering masks that are older than the current ordering mask are removed from the list of ordering masks.

In summary, the method and apparatus of the present invention provide a mechanism for masking packets prior to transmission and unmasking the packets after reception.

While we have shown and described specific embodiments of the present invention, further modifications and improvements will occur to those skilled in the art. For example, while the method and apparatus of the present invention have been described with reference to discerning the correct order of transmission, the method and apparatus of the present invention also apply to other applications for packet identification. For example, in some embodiments of the present invention, the masking and unmasking are used for identifying different types of packets such as data packets and control packets. We desire it to be understood, therefore, that this invention is not limited to the particular forms shown, and we intend in the appended claims to cover all modifications that do not depart from the spirit and scope of this invention.

What is claimed is:

1. A method of adding packet ordering information to a plurality of data packets comprising:

applying error detection codes to each of the plurality of data packets; and masking each of the plurality of data packets to which the error detection codes have been applied with a respective one of a plurality of packet ordering masks, the plurality of packet ordering masks having a known order indicating an order of transmission for the data packets, the masking being performed on a packet-by-packet basis in the known order.

2. The method of claim 1 wherein masking comprises exclusive ordering each of the plurality of data packets with a corresponding one of the plurality of packet ordering masks.

3. The method of claim 1 wherein each of the plurality of data packets to which the error detection codes have been applied is masked with one of the plurality of packet ordering masks, the plurality of packet ordering masks and the known order being known by a receiver such that the receiver can discern a relative packet order using the plurality of packet ordering masks.

4. The method of claim 1 wherein the plurality of packet ordering masks comprises cryptographic keys.

5. The method of claim 1 wherein the plurality of packet ordering masks are masks other than cryptographic keys, the method further comprising prior to applying error detection, encrypting each of the plurality of data packets.

6. The method of claim 1 wherein:

the plurality of data packets are to be transmitted in a network having a maximum latency variability; and the plurality of packet ordering masks includes a sufficient number of packet ordering masks for a receiver to identify a correct order of two packets received out of order and received a distance apart in time less than or equal to the maximum latency variability.

7. A method of determining a packet order of a received packet comprising:

applying at least one packet ordering mask to the received packet in a known order, which indicates an order of packet transmission, from a list of packet ordering masks to find a current packet ordering mask that was spaciously used to mask the received packet, the list of packet ordering masks having the known order; and when at least one older packet ordering mask exists in the list of packet ordering masks, the at least one older packet ordering mask occurring earlier in the known order than the current packet ordering mask, removing the at least one older packet ordering mask from the list of packet ordering masks.

8. The method of claim 7 wherein applying comprises:
applying a first packet ordering mask to the received packet to produce a first unmasked received packet;
checking the first unmasked received packet for errors; and
when errors in the first unmasked received packet are below a threshold, setting the current packet ordering mask to the first packet ordering mask.

9. The method of claim 8 wherein the received packet has had forward correction and masking applied thereto prior to transmission, and wherein checking comprises applying forward error correction.

10. The method of claim 7 further comprising:
successively applying the packet ordering masks that remain on the list of ordering masks to the received packet; and
when after applying all of the list of packet ordering masks to the received packet, the current packet ordering mask is not found, discarding the received packet.

11. A method of determining the transmitted order of a received data packet relative to other received data packets comprising:
setting a temporary packet ordering mask equal to a next packet ordering mask in a list of packet ordering masks, the list of packet ordering masks having a known order indicating an order of packet transmission;
applying the temporary packet ordering mask to the received data packet to produce an unmasked received data packet;
checking the unmasked received data packet for errors;
repeating the previous actions until no errors are found when errors are found; and
setting a current packet ordering mask equal to the temporary packet ordering mask.

12. The method of claim 11 wherein the current packet ordering mask defines a relative transmission order of the received data packet.

13. The method of claim 12 further comprising;
if the received data packet is older than a previously received data packet, discarding the received data packet.

14. The method of claim 12 further comprising:
if the received data packet is not older than a previously received data packet, marking the current packet ordering mask as a most recently used mask.

15. The method of claim 12 wherein the list of packet ordering masks comprises cryptographic keys.

16. A communications device comprising:
a packet receiver;
a mask store comprising a plurality of packet ordering masks having a known order, the known order representing an order of transmission of a plurality of packets;
an unmasking device coupled to the mask store and the packet receiver, the unmasking device being configured to unmask received packets by applying the packet ordering masks, one at a time and in the known order on a packet-by-packet basis, to the received packets; and
an error detection device coupled to the unmasking device, the error detection device being configured to detect errors in unmasked received packets.

17. The communications device of claim 16 further comprising a controller coupled to the mask store and the error detection device, the controller being configured to evaluate error information received from the error detection device, and further configured to command the mask store to provide packet ordering masks to the unmasking device.

18. The communications device of claim 16 wherein the mask store is a key generator capable of generating keys to decrypt encrypted packets.

19. The communications device of claim 16 wherein the mask store is configured to operate as a circular buffer such that the plurality of packet ordering masks is used more than once.

20. The communications device of claim 19 wherein the mask store is configured to maintain a most recent mask pointer that points to a most recently used packet ordering mask.

21. The communications device of claim 16 further comprising a decryptor coupled to the unmasking device, the decryptor being configured to decrypt unmasked packets using keys received from a key generator.

22. A communications device comprising:
a packet formatter adapted to receive data packets and configured to supply formatted packets;
a forward error device coupled to receive the formatted packets from the packet formatter and configured to apply error codes to the formatted packets;
a mask store comprising a plurality of packet ordering masks having a known order, said known order representing an order of transmission of a plurality of packets; and
a masking device coupled to the mask store and the forward error device and responsive thereto to apply the packet ordering masks, one at a time and in the known order on a packet-by-packet basis, to mask each of the formatted packets to which the error codes have been applied.

23. The communications device of claim 22 wherein the packet formatter is a data packet formatter.

24. The communications device of claim 22 wherein the packet formatter comprises a vocoder.

25. The communications device of claim 22 wherein the masking device comprises an encryptor, and the mask store comprises a key generator.

26. The communications device of claim 22 further comprising an encryptor coupled between the packet formatter and the forward error device, wherein the encryptor is configured to receive the formatted packets from the packet formatter, encrypt the formatted packets, and send encrypted formatted packets to the forward error device.

* * * * *